Jan. 15, 1924.
L. B. BOOTH
1,480,929
OBJECTIVE FOR PHOTOGRAPHIC AND LIKE PURPOSES
Filed July 22, 1920
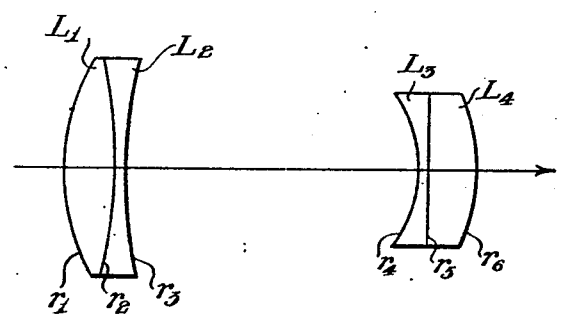
INVENTOR
Lionel B. Booth.
BY
Dunn, Goodlett, Massie & Scott
his ATTORNEYS Patented Jan. 15, 1924.

1,480,929

UNITED STATES PATENT OFFICE.

LIONEL B. BOOTH, OF CAMBRIDGE, ENGLAND.

OBJECTIVE FOR PHOTOGRAPHIC AND LIKE PURPOSES.

Application filed July 22, 1920. Serial No. 398,046.

*To all whom it may concern:*

Be it known that I, LIONEL BARTON BOOTH, a subject of the King of Great Britain, residing at Cambridge, county of Cambridge, England, have invented certain new and useful Improvements in Objectives for Photographic and like Purposes, of which the following is a specification.

This invention relates to optical systems usually known under the name of telephoto objectives in which the distance from the last surface of the objective, of the image of an object at an infinite or extremely large distance from the objective is considerably less than the focal length of the system, with the result that for photographic purposes, a large focal length is obtained with a comparatively small camera extension.

The principal object of this invention is to provide a new and simplified objective of this type which will secure nearly perfect definition over a large field, as well as a large relative aperture.

In this as in all telephoto objectives there are two groups of lenses (the term lens being used to designate a lens made of one piece and kind of glass only) the front component being a positive or collective system and the back component a negative or dispersive system.

In patent to applicant No. 1,156,743, of October 12, 1915, such an objective was calculated with four lenses only, of which one component contained an air-space, the air-space having the effect of a dispersive lens. An elimination of this air-space will reduce the number of effective reflecting surfaces by two, and there will, therefore, be a substantial increase in the light transmission. It is found by calculation that by using suitable glass an optical system consisting of two cemented pairs may be made to achieve all the correction necessary and the present invention provides an objective comprising two such cemented pairs only. The use of two separately achromatized pairs for a telephoto objective is no novelty in itself, but such objectives of this type as have been hitherto made exhibit structural differences from that of the present invention which is superior as regards definition and distortion.

While the invention is susceptible of various embodiments, there is shown in the accompanying drawing a schematic view of the preferred embodiment of which the details of construction will now be described.

In objectives of this type it is advisable to keep the well-known Petzval sum for the curvature of the stigmatic image small and slightly negative. Therefore, a glass of medium or high refractive index is chosen for the positive lens of the front component, and in order to obtain sufficient dispersive and corrective effect for the cemented surface which must have negative power, a flint glass of still higher refractive index is chosen for the dispersive lens. For the first example, a refractive index of 1.61 may be taken for the positive lens and a flint glass, whose indices of refraction for the D and $G^1$ lines of the spectrum are respectively $n\,d=1.6469$ and $n\,g^1=1.67236$, may be taken for the dispersive lens, leaving undetermined for the moment the dispersion of the glass used for the positive lens. (Such figures necessarily only approximate to the type of glass to be used.) It now remains to determine the characteristics of the negative or back component of the objective. The correction for astigmatism and curvature produced by the front combination is as a rule made on two surfaces, namely, that surface on which the light first falls after emergence from the front combination. (In this case, the fourth surface $r_4$ of the objective) and the cemented contact surface $(r_5)$. It is found that when the correction is to a large extent made by the cemented surface, that is when that surface has considerable negative power owing to large curvature and comparatively large difference of refractive indices on either side of it, the field obtained is not so good, in addition to which there is a large amount of pincushion distortion present. It has been found better, therefore, to make the negative power of the cemented surface not greater than 5% of that of the fourth surface $(r_4)$; or even to make the power of the cemented surface positive in either case throwing the bulk of the correction onto the fourth surface. For manufacturing reasons, it is of advantage to reduce the power of the cemented surface by using as shallow a curve as possible and therefore, to choose glasses which make possible the use of a plane surface. In the first example two glasses of nearly the same refractive index for the D-line are used for the two lenses, though differing in dispersions and the refractive index chosen is in the neighborhood of 1.574. An advantage accruing from the use of such glasses is that any residual chromatic aberrations which might occur from slight variations from type in the glasses used can be corrected by slight alteration of the curve of contact without materially influencing the correction of the aberrations in the system.

Calculations show that using the above mentioned pair of glasses in the front component (namely a refractive index of 1.61 for the positive lens and 1.6469 for the dispersive lens), a completely anastigmatic objective can be made free from spherical aberration and coma for a large aperture. The dispersive power of the glass used for the positive lens of the front component is now determined and the glass required has approximately the following indices: $n\ d = 1.61$ and $n\ g^1 = 1.62476$ with a probable $v$-value for the ratio of the refractivity for the D line to the mean dispersion of about 53. Glass of such characteristics may now be procured and its use in the first example has the additional advantage that owing to its optical position as regards dispersion it is not so extreme as many of the barium crowns used for a like purpose and therefore, it is more transparent and freer from bubbles and other defects than such other glasses.

The full details for the construction of such an objective are given in the table following. Where the sign preceding a radius is $+$ the surface is convex, and where $-$, concave to the incident light, the surfaces being numbered in the order in which they occur beginning with that on which the light first falls.

| | Radii. | Thickness at centre. | Diameter. |
|---|---|---|---|
| $L_1$—1st lens | $\{r_1 = +1.827,\ r_2 = -3.935\}$ (Cemented.) | .35 | 1.75 |
| $L_2$—2nd lens | $\{r_2 = -3.935,\ r_3 = +4.213\}$ | .10 | 1.75 |
| Separation 2.317. | | | |
| $L_3$—3rd lens | $\{r_4 = 1.0846,\ r_5 = \infty\}$ (Cemented.) | .083 | 1.25 |
| $L_4$—4th lens | $\{r_5 = \infty,\ r_6 = -1.6633\}$ | .333 | 1.25 |

Glass used.

| | $n\ d$ | $n\ g^1$ | $v$ |
|---|---|---|---|
| $L_1$ | 1.61 | 1.62474 | 53.3 |
| $L_2$ | 1.6498 | 1.67553 | 33.6 |
| $L_3$ | 1.5753 | 1.58816 | 57.1 |
| $L_4$ | 1.5734 | 1.59034 | 44.1 |

Focal length = 10. Working aperture F/6.

It is found that the above pair of glasses is not the only one possible, but it is probably the best, as the use of so high refractive indices tends to keep the Petzval sum algebraically small. An alternative positive combination, using, for the crown lens a barium crown of medium refractive index is as follows:—

| | | Thickness at centre. | Diameter |
|---|---|---|---|
| $L_1$—1st lens | $\{r_1 = +1.808,\ r_2 = -4.05\}$ (Cemented.) | .35 | 1.75 |
| $L_2$—2nd lens | $\{r_2 = -4.05,\ r_3 = +4.695\}$ | .117 | 1.75 |

Glasses.

| | $n\ d$ | $n\ g^1$ | $v$ |
|---|---|---|---|
| $L_1$ | 1.57 | 1.58259 | 57.9 |
| $L_2$ | 1.618 | 1.64044 | 36.4 |

Also an alternative negative combination is as follows: In this case there is a difference in refractive indices of the last two glasses, the power of the cemented surface being very small, since the curve of contact is very shallow.

| | | Thickness at centre. | Diameter. |
|---|---|---|---|
| $L_3$—3rd lens | $\{r_4 = -1.100,\ r_5 = +16.67\}$ (Cemented.) | .083 | 1.25 |
| $L_4$—4th lens | $\{r_5 = +16.67,\ r_6 = -1.818\}$ | .33 | 1.25 |

Glasses.

| | $n\ d$ | $n\ g$ | $v$ |
|---|---|---|---|
| $L_3$ | 1.5833 | 1.59959 | 46.6 |
| $L_4$ | 1.6214 | 1.6420 | 39.8 |

The separation of front and back components must be adjusted to give the final corrections when the alternative positive or negative is used. In each case, the positive and negative combinations are approximately separately corrected for chromatic aberrations.

A system could be calculated with an even lower refractive index for the positive lens of the front combination, but owing to the consequent algebraic increase in the Petzval sum thereby produced, the field would tend to be less well corrected, and the distortion consequent on the alteration in the negative combination to produce more astigmatic correction would also be increased.

I claim:

1. In a telephoto objective corrected for spherical aberration, coma, astigmatism, curvature, and chromatic aberrations, having a large relative aperture and a large useful field, the combination with a front component comprising a biconvex first lens of glass having a refractive index for the D-line of the spectrum of at least 1.54 cemented to a biconcave second lens of glass of refractive index greater by at least 0.03 than that of said first mentioned glass, and a back component comprising a third lens cemented to a fourth lens of which third lens the surface nearest the front component is dispersive and the cemented surface is plane.

2. In a telephoto objective corrected for spherical aberration, coma, astigmatism, curvature, and chromatic aberrations, having a large relative aperture and a large useful field, the combination with a front component comprising a biconvex first lens of glass having a refractive index for the D-line of the spectrum of at least 1.54 cemented to a biconcave second lens of glass of refractive index greater by at least 0.03 than that of said first mentioned glass, and a back component comprising a third lens cemented to a fourth lens of which third lens the surface nearest the front component is dispersive and the cemented surface is plane, the index of refraction of the glass in said fourth lens being numerically greater than the index of refraction of the glass in said third lens less 0.01.

3. In a telephoto objective corrected for spherical aberration, coma, astigmatism, curvature, and chromatic aberrations, having a large relative aperture and a large useful field, the combination with a front component comprising a biconvex first lens of glass having a refractive index for the D-line of the spectrum of at least 1.54 cemented to a biconcave second lens of glass of refractive index greater by at least 0.03 than that of said first mentioned glass, and a back component comprising a third lens cemented to a fourth lens of which third lens the surface nearest the front component is dispersive and the negative power of the cemented surface does not exceed 5% of that of said first named surface.

4. In a telephoto objective corrected for spherical aberration, coma, astigmatism, curvature and chromatic aberrations having a large relative aperture and a large useful field, the combination with a front component comprising a bi-convex lens of crown glass of medium refractive index cemented to a bi-concave lens of flint glass of refractive index greater than that of the crown glass by an amount between .03 and .07, and a back component comprising a cemented pair of lenses of which the surface nearest the front component is dispersive and the cemented surface has a negative power not greater than 5% of that of said first named surface, both components being approximately separately corrected for chromatic aberrations.

5. In a telephoto objective corrected for spherical aberration, coma, astigmatism, curvature and chromatic aberrations having a large relative aperture and a large useful field, the combination with a front component comprising a bi-convex lens of crown glass of high refractive index cemented to a bi-concave lens of flint glass of refractive index greater than that of the crown glass by an amount between .03 and .07, and a back component comprising a cemented pair of lenses of which the surface nearest the front component is dispersive and the cemented surface has a negative power not greater than 5% of that of said first named surface, both components being approximately separately corrected for chromatic aberrations.

6. In a telephoto objective corrected for spherical aberration, coma, astigmatism, curvature and chromatic aberrations having a large relative aperture and a large useful field, the combination with a front component comprising a bi-convex lens of crown glass of medium refractive index cemented to a bi-concave lens of flint glass of refractive index greater than that of the crown glass by an amount between .03 and .07, and a back component comprising a cemented pair of lenses of which the surface nearest the front component is dispersive and the negative power of the cemented surface does not exceed 5% of that of said first named surface, both components being approximately separately corrected for chromatic aberrations.

L. B. BOOTH.